United States Patent [19]

Reen

[11] 3,935,169

[45] Jan. 27, 1976

[54] METHOD OF PREPARING POLYESTER POWDER

[75] Inventor: Robert Richard Reen, Stamford, Conn.

[73] Assignee: ICI United States Inc., Wilmington, Del.

[22] Filed: June 28, 1974

[21] Appl. No.: 484,163

Related U.S. Application Data

[63] Continuation of Ser. No. 295,476, Oct. 2, 1972.

[52] U.S. Cl. ............................. 260/75 T; 260/96 R
[51] Int. Cl.² ........................................ C08G 63/70
[58] Field of Search .................... 260/75 T, 96 R

[56] References Cited
UNITED STATES PATENTS 2,945,840   7/1960   Roberts et al. .................... 260/75 T
3,510,457   5/1970   Janssen ............................. 260/75 T

FOREIGN PATENTS OR APPLICATIONS 1,201,523   8/1970   United Kingdom

OTHER PUBLICATIONS

Korshak et al, *Polyesters*, Pergamon Press, N.Y. (1965), pp. 279, 298, 510–512

Primary Examiner—Howard E. Schain
Assistant Examiner—W. C. Danison, Jr.

[57] ABSTRACT

An improved method of preparing a polyester powder is disclosed wherein a polyester resin is dissolved in benzyl alcohol and the powder is subsequently precipitated from said solution by the use of a suitable diluent.

6 Claims, No Drawings

METHOD OF PREPARING POLYESTER POWDER

This is a continuation of application Ser. No. 295,476, filed Oct. 2, 1972.

BACKGROUND OF THE INVENTION

1. Field of the Invention

The present invention relates generally to an improved method of preparing a finely-divided polyester powder. More particularly, the invention relates to a method comprising a. dissolving a polyester resin in benzyl alcohol and b. subsequently precipitating a finely-divided polyester powder from said solution by the use of a suitable diluent solvent.

2. Description of the Prior Art

Finely-divided polyester powders have been described in the art. See, in this regard, British Pat. No. 1,201,523 issued to Imperial Chemical Industries Limited. These polyester powders are suitable for a wide variety of uses including, for example, dulling or flattening agents in coating compositions and components in cosmetic preparations. The use of these materials in coating compositions was described in British Pat. No. 1,131,303 issued to Imperial Chemical Industries Limited and their use in cosmetic preparations has been described in British Pat. Nos. 1,093,108 and 1,202,796, both of which are also issued to Imperial Chemical Industries Limited.

As is described in British Pat. No. 1,201,523 mentioned above it has previously been known that polyester powders could be prepared by dissolving a synthetic polyester in a solvent at an elevated temperature, heating for a period of time, and subsequently mixing the warm solution with a diluent to cause precipitation of the polyester in a finely-divided form. Solvents which were previously employed to dissolve the synthetic polyester resin included propylene carbonate and ethylene carbonate. As pointed out in British Pat. No. 1,201,523, the solution of polyester had to be heated for a period of time of at least 30 minutes and, to insure that the synthetic polyester would be precipitated in a finely-divided form rather than as fibers, prolonged heating was necessary. This extended heating was required to break down or hydrolyze the polymer to reduce its molecular weight.

It has now been found, in accordance with the present invention, that a finely-divided polyester powder may be prepared without the necessity of prolonged heating by employing benzyl alcohol as the solvent in a process such as that described above.

SUMMARY OF THE INVENTION

In accordance with the present invention, a finely-divided polyester powder is prepared by a method comprising, first, dissolving a synthetic polyester resin in benzyl alcohol and, subsequently, precipitating a finely-divided polyester powder by the use of a diluent solvent.

DESCRIPTION OF THE PREFERRED EMBODIMENTS

The method of the present invention may be employed to prepare a finely-divided polyester powder from any of the synthetic polyester resins which are well known in the art. Examples of synthetic polyester resins which may be employed in the method of the present invention include, for example, ethylene terephthalate, ethylene isophthalate, ethylene ortho-phthalate, and copolymers and mixtures thereof. The polyester resin to be treated may be especially prepared for reduction to a powder by the method of the present invention or, alternatively, polyester scrap such as results in the production of polyester film may be treated by this method to produce a useful product. To facilitate handling of the material, it is preferred, although not necessary, that the polyester first be reduced in size such as by coarse shredding or chipping.

When preparing polyester powders in accordance with the present invention, the polyester resin is first dissolved in warm benzyl alcohol. Preferably, the resin is dissolved by stirring in benzyl alcohol heated to a temperature of about 180°C. although any temperature sufficient to dissolve the polyester resin may be employed.

Once the polyester has been dissolved, it may immediately be precipitated from the benzyl alcohol by treatment with a diluent solvent as is described in detail below. However, to insure complete solution, it is preferred to heat the solution for a short period of time, less than 30 minutes, prior to the addition of the diluent solvent. In this regard, preferred results have been achieved by heating the solution at a temperature of from about 160°C., which is sufficient to keep the polyester in solution, to about 205°C., the boiling point of the benzyl alcohol.

Although prolonged heating is not required to produce polyester powders in accordance with the present invention, it has been found that storage of the solution at elevated temperatures for prolonged periods of time does not deleteriously affect either the product produced or the benzyl alcohol employed.

The polyester powder is subsequently precipitated from the solution by the use of a suitable diluent solvent. In precipitating the powder, it has not been found to be critical to employ any given diluent. However, it is preferred to employ a diluent which is relatively inexpensive, has low flammability and is soluble in the benzyl alcohol. Suitable diluents which may be employed include, for example, isopropyl alcohol, toluene and xylene.

When precipitating the polyester resin, the hot solution of the resin may be added to the cold, stirred diluent or the diluent may be added to the polyester solution. The desired polyester powder can then be removed from the solvents by any suitable method such as filtration or centrifugation. Another advantage of the process of the present invention is that the solvent employed may be recovered, separated and reused in subsequent operations.

Although not wishing to be bound by any specific theory, but, in order to assist those skilled in the art in understanding the present invention, it is believed that the improved results achieved with the process of the present invention are due to the fact that the benzyl alcohol reacts with the polyester resin and, by virtue of an ester interchange reaction, results in a significant reduction in the molecular weight of the polyester. By comparison, the inert solvents employed in the prior art require heating over an extended period of time to achieve a comparable reduction in molecular weight sufficient to assure that the polyester material would precipitate from solution as a powder rather than in a fiber form.

In addition to the uses of these powders which have been suggested in the prior art, the powders prepared in accordance with the present invention may be employed as filler for paints, lacquers, plaster, roof cements, linoleum, asphalt shingles, and as a filtering medium.

In order to describe the present invention so that it may be more clearly understood, the following example is set forth. This example is given primarily for the purpose of illustration of the concept of the present invention.

EXAMPLE 1

Into a reaction flask, equipped with a mechanical stirrer, thermometer, dropping funnel, and reflux condenser, there was added 100 grams of benzyl alcohol. While stirring the solvent, there was then added 25 grams of a polyethylene terephthalate type polyester resin. The resulting mixture was then heated to 180°C. during which time the polyester resin dissolved. To insure a complete solution, the batch was stirred at 180°C. for 15 minutes.

After cooling to 160°C., 100 grams of xylene were added dropwise, while maintaining the reaction temperature in the range of from 150°C. to 160°C.

After all of the xylene had been added, the reaction mixture was stirred and cooled to below 30°C. The resulting finely-divided polyester powder was filtered off, washed with 50 grams of xylene, and sucked dry. The product was then dried for a period of about 7 hours in a vacuum oven at about 85°c./300 mm. Hg.

The resulting product was a polyester powder which, if desired, could be easily ground to a finer particle size.

If desired, the solvents employed could be recovered and separated by distilllation at atmospheric pressure.

What is claimed is:

1. A method of preparing a polyester powder from a synthetic polyester resin, selected from the group consisting of polyethylene terephthalate, polyethylene isophthalate, polyethylene orthophthalate, copolymers and mixtures thereof, said method comprising
   a. dissolving the polyester resin in benzyl alcohol; and
   b. precipitating the polyester powder by combining the solution with a diluent.

2. A method, as claimed in claim 1, wherein the polyester is dissovled by heating the solvent to about 180°C.

3. A method, as claimed in claim 1, wherein the polyester resin is a polyethylene terephthalate.

4. A method, as claimed in claim 1, wherein the diluent is xylene.

5. A method, as claimed in claim 1, wherein the solution is maintained at a temperature of from about 160°C. to about 205°C. for less than 30 minutes before being treated with the diluent.

6. A method, as claimed in claim 1, wherein the polyester powder is precipitated by adding the diluent to the solution.

* * * * *